United States Patent [19]
Ben-Porat et al.

[11] Patent Number: 5,362,344
[45] Date of Patent: Nov. 8, 1994

[54] DUCTED SUPPORT HOUSING ASSEMBLY

[75] Inventors: Avi Ben-Porat, Norwalk; George Milo, Huntington; Walter Smith, Hamden; Theodore Westerman, Easton, all of Conn.

[73] Assignee: Avco Corporation, Providence, R.I.

[21] Appl. No.: 12,581

[22] Filed: Feb. 3, 1993

[51] Int. Cl.⁵ .................. B32B 5/08; B65H 81/02; F01D 5/14
[52] U.S. Cl. .................. 156/148; 29/889.21; 156/172; 156/175; 156/189; 416/230; 416/241 A
[58] Field of Search .............. 156/148, 169, 172, 173, 156/175, 189, 191; 29/889.21; 416/230, 241 A

[56] References Cited

U.S. PATENT DOCUMENTS

| | | | |
|---|---|---|---|
| 3,221,398 | 1/1961 | Mayne | 29/156.8 |
| 3,393,436 | 9/1966 | Blackhurst et al. | 29/156.8 |
| 3,511,578 | 7/1968 | Horst | 416/178 |
| 3,549,444 | 12/1970 | Katz | 156/175 |
| 3,616,508 | 1/1969 | Wallett | 29/156.8 |
| 4,238,540 | 12/1980 | Yates | 156/175 |
| 4,494,436 | 1/1985 | Kruesi | 156/148 |
| 4,519,290 | 5/1985 | Inman | 156/148 |
| 4,710,412 | 12/1987 | Darrieux | 244/54 |
| 4,734,146 | 3/1988 | Halcomb | 156/148 |
| 4,786,347 | 11/1988 | Angus | 156/172 |
| 4,846,908 | 7/1989 | Aldrich | 156/148 |
| 4,930,987 | 6/1990 | Stahl | 416/93 A |
| 4,991,766 | 2/1991 | Hunnicutt, III et al. | 228/175 |
| 5,018,271 | 5/1991 | Bailey et al. | 29/889.71 |
| 5,200,012 | 4/1993 | Blavignac | 156/169 |

Primary Examiner—Michael W. Ball
Assistant Examiner—Daniel J. Stemmer
Attorney, Agent, or Firm—Perman & Green

[57] ABSTRACT

A method is disclosed of making an integral structure comprised of inner and outer coaxial shells mutually supported so as to define an annular passageway between the shells. The integral structure may be an air inlet housing for a gas turbine engine and the inner shell may be a hub member having a generally cylindrical passage extending therethrough for rotatably receiving a drive shaft. The inner shell is formed by braiding on a shaped mandrel a plurality of fibers such as fiberglass, boron, carbon, or the like, to form an inner shell preform having an outer surface of revolution. A plurality of duct preforms are similarly formed on a conical mandrel, then removed, and administered onto an outer peripheral surface of a duct mold so as to define a modified shape. The modified duct preforms are then positioned onto the outer surface of the inner shell preform in side-by-side relationship such that the first and second lateral surfaces on adjacent modified duct preforms are coextensive and engaged, the plurality of modified duct preforms completely circumscribing the inner shell preform. Then, a plurality of fibers are braided across the plurality of outer modified duct surfaces of the duct preforms to form an outer shell preform spaced from and coaxial with the inner shell preform. Thereafter, resin is applied to the structure to encapsulate the braided inner shell preform, the braided modified duct preforms, and the braided outer shell preform. The resin is then cured to thereby complete fabrication of the integral structure.

11 Claims, 6 Drawing Sheets

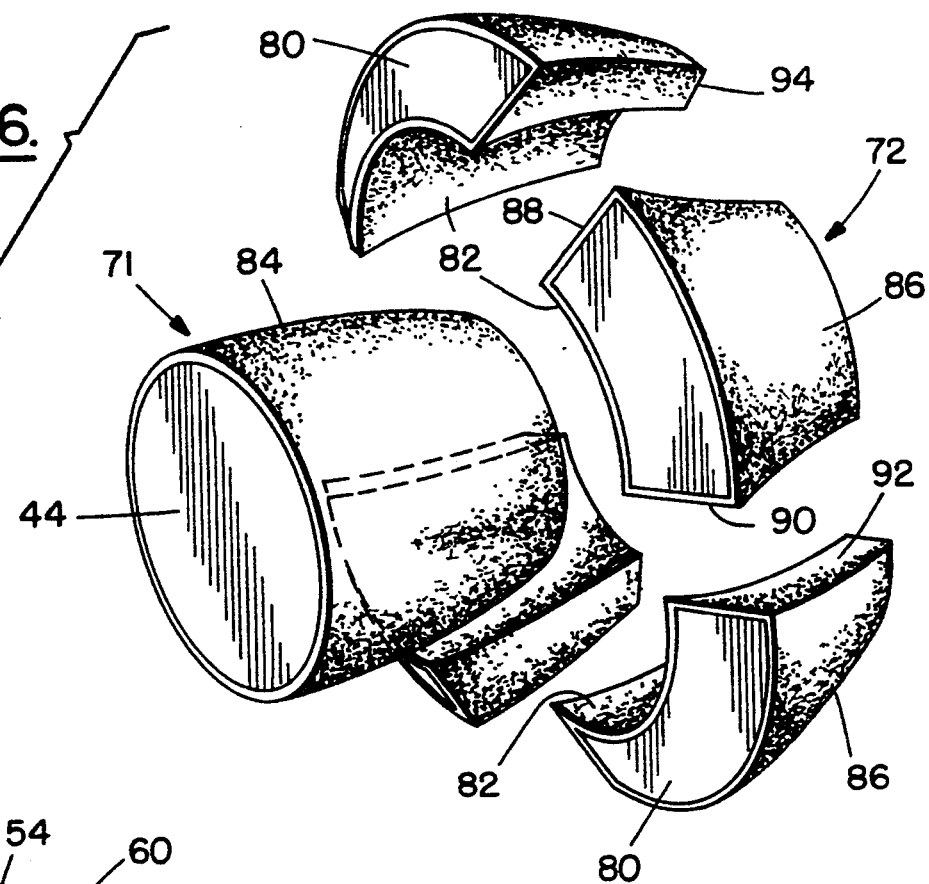
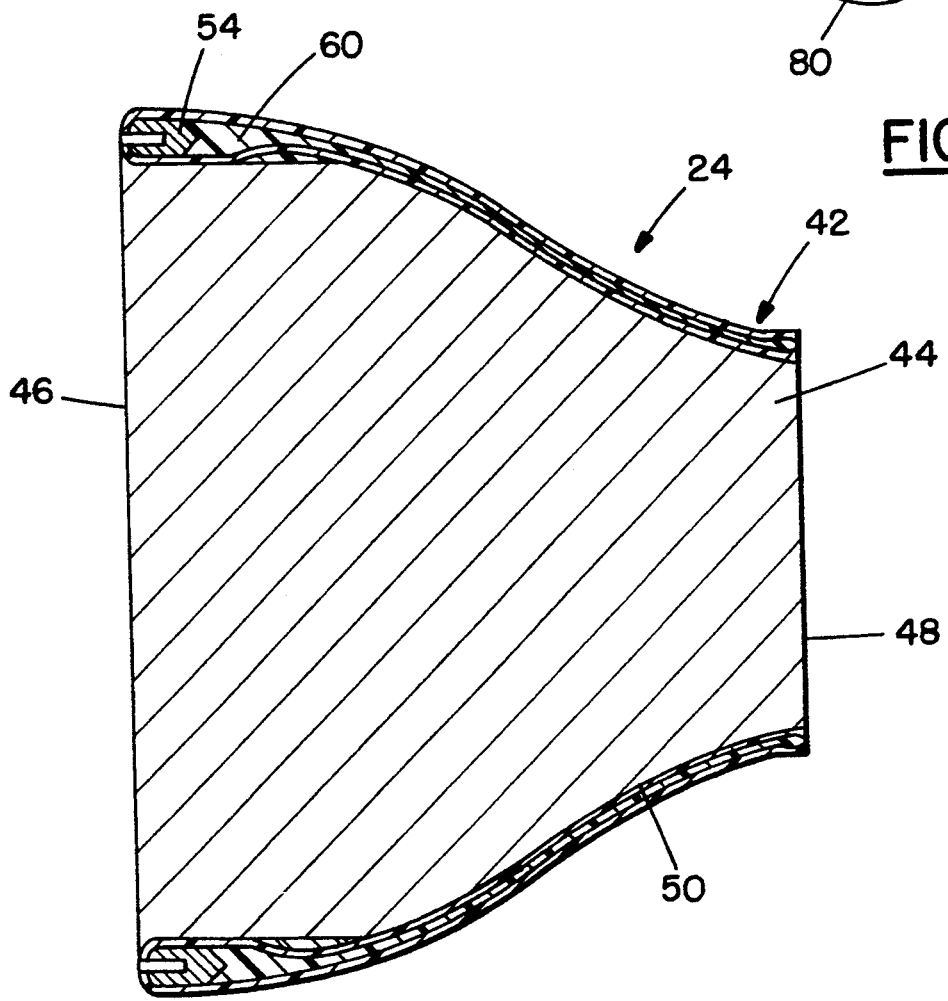

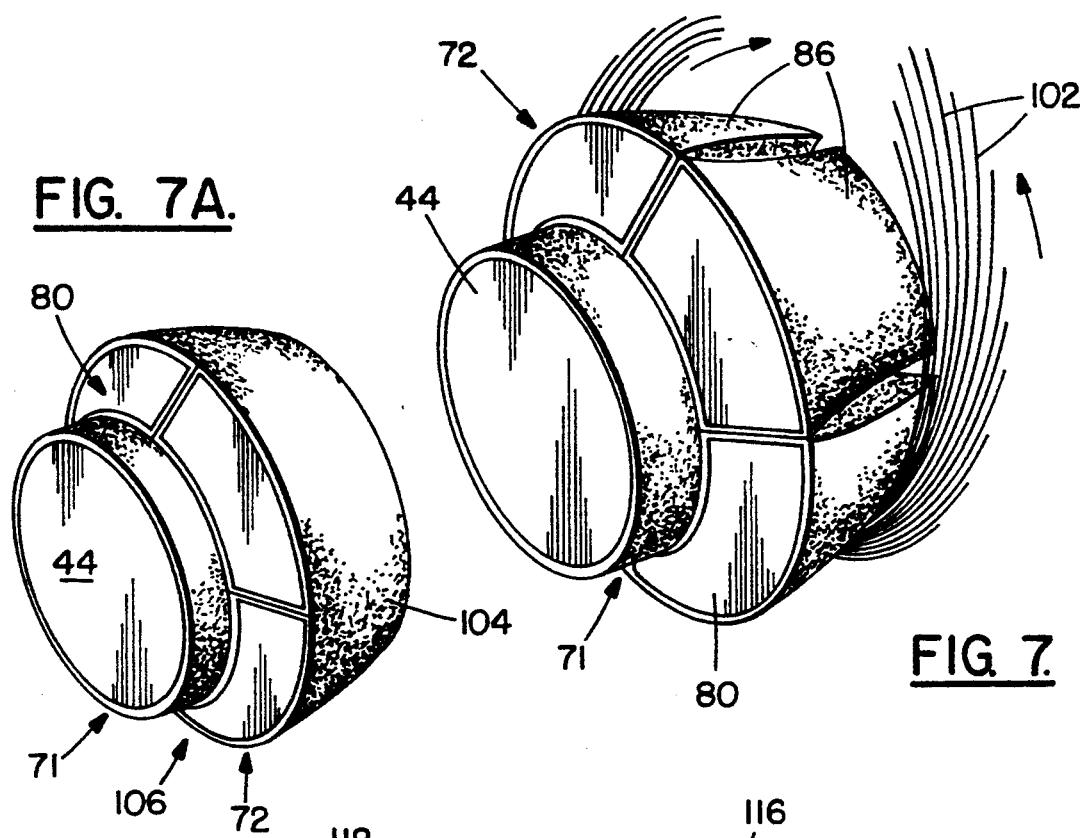
FIG. 7A.
FIG. 7.
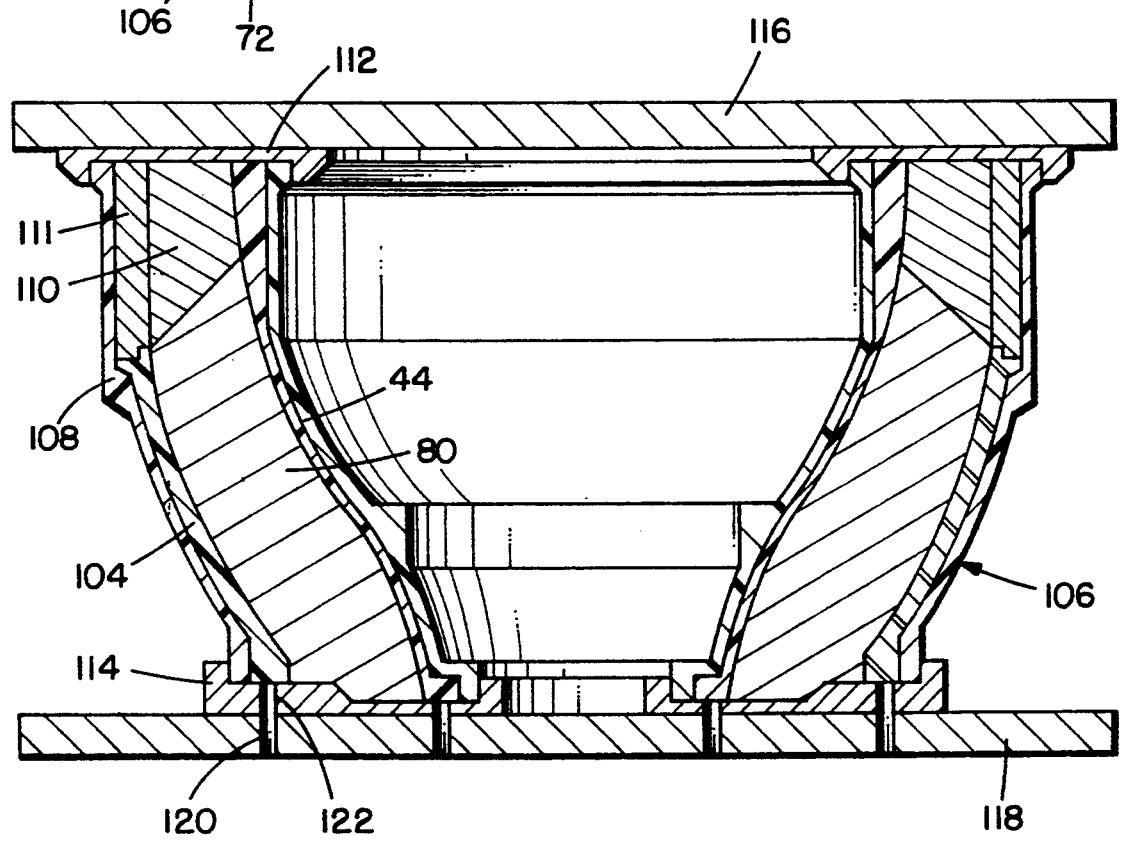
FIG. 8.

DUCTED SUPPORT HOUSING ASSEMBLY

BACKGROUND OF THE INVENTION

1. Field of the Invention

This invention relates generally to components fabricated from braided fiber composite materials and, in particular, to a method of making an integral structure so fabricated comprised of inner and outer coaxial shells mutually supported so as to define an annular passageway therebetween. Throughout the instant disclosure, the terms "braided fiber" or "braiding" are intended to include "woven or knitted fabric" or "weaving" or "knitting", although the specific construction of braided fiber and the specific method of braiding are considered to be preferable to the specific constructions of woven or knitted fabrics and the specific methods of weaving and knitting.

2. Description of the prior Art

It is known to utilize elongate material, such as boron fibers, carbon fibers, and glass fibers for the reinforcement of gas turbine engine components such as compressor and turbine blades and vanes. In particular, the potential for usage of high modulus, high strength fibers, such as carbon, silicon carbide, boron, and glass in a resin or metal matrix is widely recognized. A typical application of such materials is disclosed in U.S. Pat. No. 5,018,271 to Bailey et al. In that particular instance, a composite gas turbine engine blade is disclosed as being made by braiding a plurality of fibers to form a preform. After braiding, the preform is placed in a mold provided with a blade shaped cavity and is subjected to matrix infiltration while the mold halves are pressed together by suitable pressing means such as a hydraulic cylinder. The goal of the present invention is to utilize a similar technique for the construction of a component which heretofore has only been constructed of metal, namely, magnesium, aluminum and, more recently, titanium and steel.

SUMMARY OF THE INVENTION

Accordingly, the present invention relates to a method is disclosed of making an integral structure comprised of inner and outer coaxial shells mutually supported so as to define an annular passageway between the shells. The integral structure may be an air inlet housing for a gas turbine engine and the inner shell may be a hub member having a generally cylindrical passage extending therethrough for rotatably receiving a drive shaft. The inner shell is formed by braiding on a shaped mandrel a plurality of fibers such as glass, boron, carbon, or the like, to form an inner shell preform having an outer surface of revolution.

A plurality of duct preforms are similarly formed on a desired shape of mandrel (conical, for example), then removed, and administered onto an outer peripheral surface of a duct mold so as to define a modified shape. As modified, each duct preform is comprised of an inner duct surface shaped to congruently mate with the outer surface of the inner shell preform, an outer duct surface spaced from the inner duct surface and first and second lateral walls having opposed lateral surfaces. The duct preforms are then positioned onto the outer surface of the inner shell preform in side-by-side relationship such that first and second lateral surfaces on adjacent duct preforms are coextensive and engaged, the plurality of duct preforms completely circumscribing the inner shell preform.

Then, a plurality of fibers are braided (or placed on a preform) across the plurality of the outer duct surfaces to form an outer shell preform spaced from and coaxial with the inner shell preform. Thereafter, resin is applied to the structure to encapsulate the braided inner shell preform, the braided duct preforms, and the braided outer shell preform and the resin is then cured to thereby form the integral structure.

A broad objective of the invention is to exploit the advantages offered by emerging organic matrix composites technology by tailoring resin systems to mold lightweight, low cost, engine components. A more specific objective is to achieve a structure which will exhibit the greatest possible strength between an inner shell and an outer shell with a plurality of circumferentially spaced integral strut members defining ducts while avoiding stress concentrations where the strut members join with the outer shell and with the inner shell. With this end in mind, an inlet housing for a gas turbine engine is sought which will outperform its magnesium or aluminum counterparts, specific objectives being to eliminate corrosion and reduce weight by at least 15% relative to an equivalent aluminum part.

A primary object of the invention, then, is to provide a ducted inlet housing assembly for a gas turbine engine which is an integral structure comprised of inner and outer coaxial shells mutually supported so as to define an annular passageway therebetween.

Another object of the invention is to provide such an integral structure which is not subject to corrosion, which is substantially lighter in weight, and which requires less maintenance than conventional constructions.

A further object of the invention is the provision of such an integral structure fabricated from braided fiber composition materials.

Still another object of the invention is the provision of such a structure which can be more economically manufactured operated, and maintained.

Yet a further object of the invention is to provide such a construction in which repeatability of manufacture can be assured and which assures uniform load transfer along the periphery of the structure. Still another object of the invention is to provide such a construction which can tolerate substantial damage, including ballistic damage, handling damage and the like without losing its effectiveness. Still another object of the invention is the provision, at leading and trailing ends of the inner and outer coaxial shells of metallic annular end plates which contain provision for fastening the structure to other components of the gas turbine engine.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 3 is an elevational cross section view illustrating fabrication of one component of the invention;

FIG. 6 is a perspective exploded view illustrating a further step in the process of the invention;

FIG. 7 is a perspective view illustrating yet another step in the process of the invention;

FIG. 7A is a perspective view illustrating the completed fabrication of an inlet housing preform according to the invention;

FIG. 8 is a cross section view, in elevation, illustrating yet a further step in the process of the invention;

DETAILED DESCRIPTION OF THE PREFERRED EMBODIMENT

Figures 1, 2:
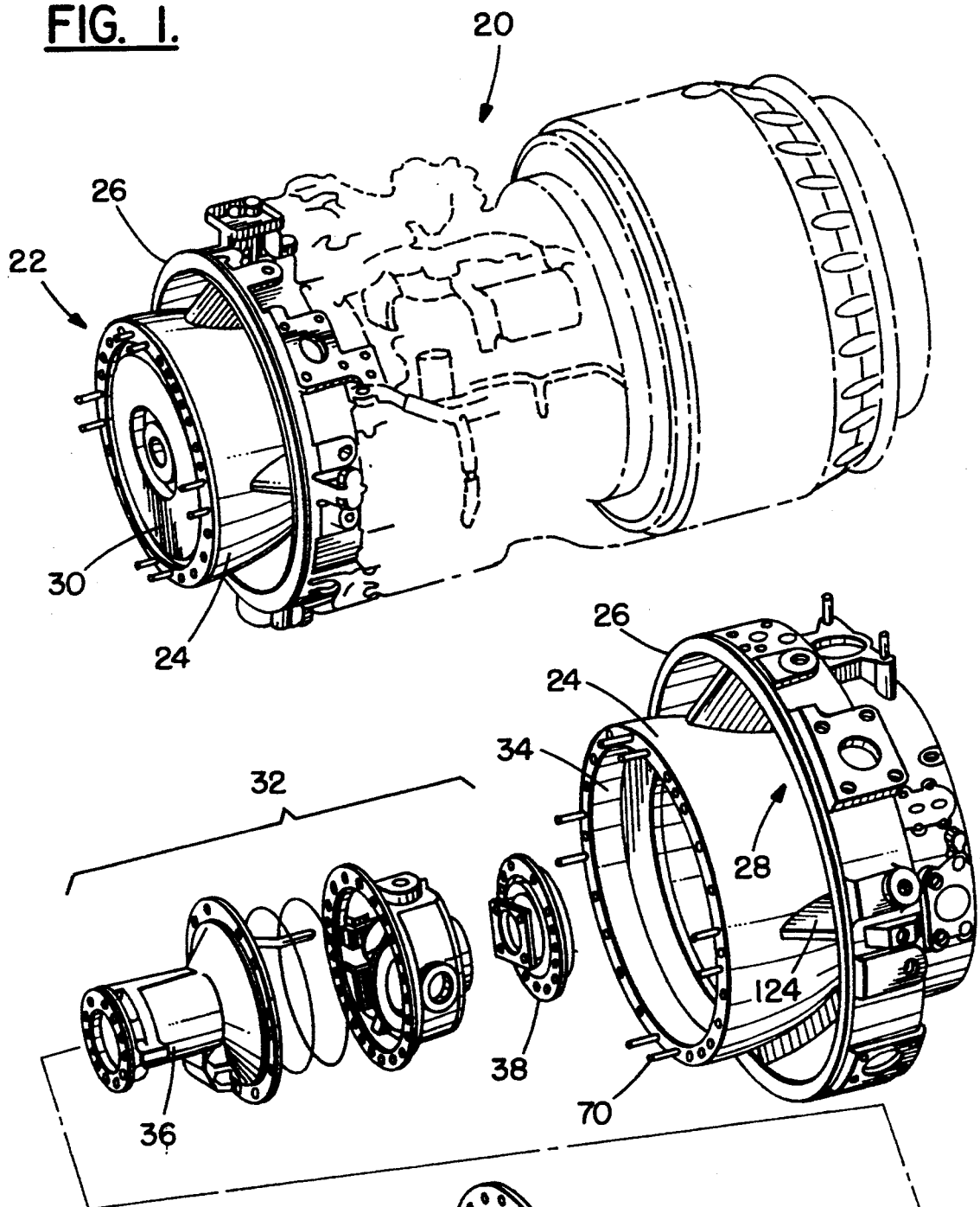
FIG. 1 is a perspective view diagrammatically illustrating a gas turbine engine utilizing an inlet housing embodying the present invention.
FIG. 2 is a perspective exploded view of certain components illustrated in FIG. 1.

Turn now to the drawings, and, initially, to FIGS. 1 and 2 which illustrate a typical gas turbine engine 20 incorporating an inlet housing 22 embodying the present invention. Originally, the inlet housing 22 was fabricated from magnesium. However, because of difficulties experienced with that metal including its flammability, its corrosiveness and other drawbacks, its use in new applications has been discontinued or restricted. Specifically, the incorporation of toxic substances in magnesium alloys to enhance its strength and other properties has recently become prohibited. As a result, aluminum and titanium have become the materials of choice, but the added weight of aluminum and titanium as compared to magnesium has had a detrimental effect on the overall performance of the engine. By reason of recent improvements in organic matrix composite technology and in braiding techniques, it has been found to be possible to produce the inlet housing 22 in a manner which eliminates problems of corrosion, can reduce weight by 10-20 percent relative to magnesium or up to 50 percent relative to the part fabricated from aluminum, and to carry loads in an engine which has an output approximately 40 percent greater than that of its predecessor.

The inlet housing 22 of the invention includes inner and outer coaxial shells 24, 26 respectively, which are mutually supported so as to define an annular passageway 28 between them. With the aid of a mounting plate 30 which can be suitably attached to the inner shell 24, an output group 32 is receivable within a generally cylindrical passage 34 extending through the inner shell 24, as a hub member, and is suitably attached to the inner shell. The output group 32 includes forward and aft bearings and bearing supports 36, 38 respectively, which, in turn, rotatably support a drive shaft 40 which is part of a power output train of the engine 20 connected with the power turbine (not shown) via appropriate mechanical means.

Figure 4A:
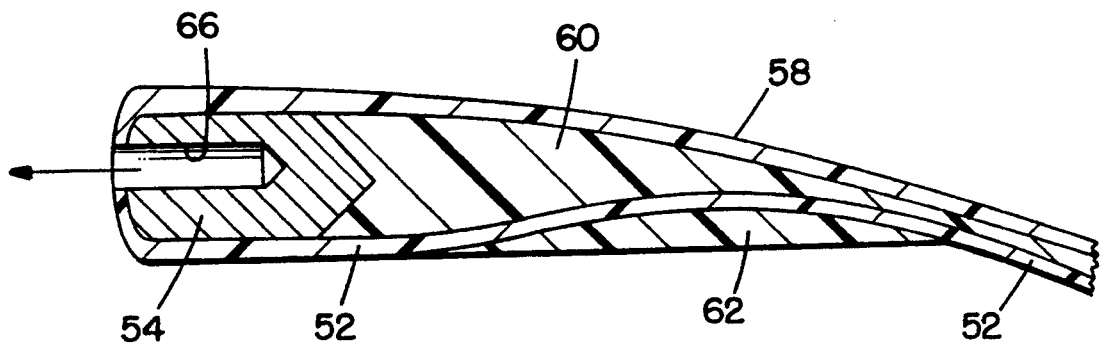
FIGS. 4A and 4B are detail cross section views illustrating parts of FIG. 3.
Figure 4B:
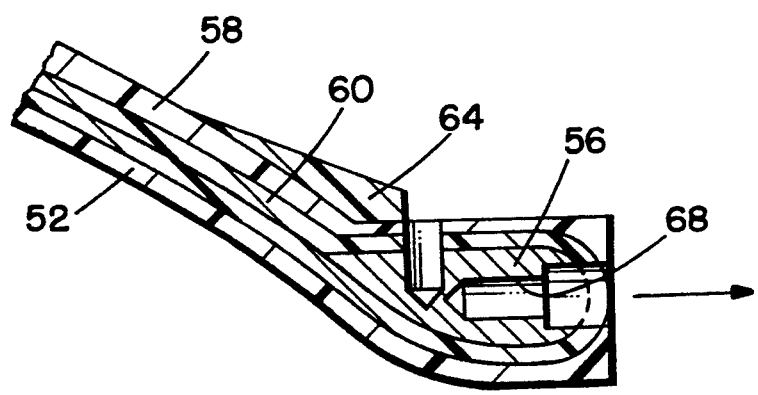

Turn now to FIGS. 3, 4A and 4B for a description of the fabrication of the inner shell 24. A plurality of fibers 42 which may be, for example, glass, carbon, boron, or aramid, for example, KEVLAR brand fibers are braided in a known manner on a shaped mandrel 44. The braided fibers 42 may be laid down in a single course or in multiple courses, as desired. The mandrel 44 may be of any desired shape but, in FIG. 3, is illustrated as being generally cylindrical but smoothly tapering from a first end 46 to a second end 48. In any event, an outer surface 50 of the mandrel 44 is substantially a surface of revolution.

In a preferred construction, as illustrated more clearly in FIGS. 4A and 4B, a first course of fibers 52 is braided onto the outer surface 50 of the mandrel 44. In the course of the braiding process, a first annular metallic end plate 54 may be positioned on the first course of fibers 52 adjacent the first end 46 of the mandrel 44. At substantially the same time, a second annular metallic end plate 56 may be positioned on the first course of fibers 52 adjacent the second end 48 of the shaped mandrel 44. The braiding process then continues such that the braided fibers 42 intertwine and encircle the first and second end plates 54, 56 and thereby apply a second course of fibers 58 eventually overlying the first course of fibers 52. Suitable light weight filler material 60 which may be a polymer foam, for example, may be provided between the first and second courses 52, 58 and extending between the first and second end plates 54, 56, so as to avoid small radius curves in the first and second courses of fibers which would result in regions of high stress concentration. It will be understood that while, for the construction just described, there must be at least one course of fibers comprising the first course 52 and at least one course of fibers comprising the second course 58, there may, in actual fact, be many such courses should that be the desired construction. Additional filler material or a structural strengthening circumferential layer as indicated at 62 (FIG. 4A) and 64 (FIG. 4B) may also be provided for the structure of the inner shell 24 in order to avoid stress concentrations. Although the filler material 62 and 64 would preferably be applied by means of braiding, it may be applied using other techniques such as by placement of a metallic ring or by use of a continuous fiber wind and it may be comprised of material other than glass, carbon, and boron fibers. The end plates 54, 56 are preferably provided with a plurality of circumferentially spaced tapped holes 66, 68, respectively, to receive studs 70 (FIG. 2) or other suitable fasteners for the purpose of attaching the mounting plate 30 or other components to the inner shell 24. Upon the completion of the braiding operation as depicted in FIGS. 3, 4A, and 4b, the braided fibers 42 actually define an inner shell preform 71 (FIG. 6) which, like the mandrel 44, has an outer surface which is substantially a surface of revolution. The first end ring or annulus plate 54 defines a leading end of the resulting inner shell preform 71 and the second end ring or annulus plate 56 defines a trailing end of the inner shell preform.

Turn now to FIGS. 5A, 5B, 5C, and 5D for a description of the fabrication of a plurality of duct preforms 72 (FIG. 5C and 6), a plurality of which will be integrated with the structure which results in the inlet housing 22. To this end, a plurality of fibers 74 are braided in the manner previously employed with respect to the inner shell preform 71 on a generally conical mandrel 76 to form an initial duct preform 78 (FIG. 5B) having a conical shape which is congruent with that of the mandrel 76. Upon completion of the braiding operation, the initial duct preform 78 is removed from the conical mandrel 76 (see FIG. 5B). Then it is administered onto the outer peripheral surface of a duct mold 80 (FIG. 5C) so as to contiguously conform to the shape of the duct mold and thereby define a modified shape of the initial duct preform 78. As modified, viewing FIG. 6, each modified duct preform 72 includes an inner duct surface 82 shaped to congruently mate with the outer surface 84 of the inner shell preform 71, an outer duct surface 86 spaced from the inner duct surface 82, and spaced apart lateral walls 88, 90 having opposed lateral surfaces 92, 94, respectively.

Figure 5A:
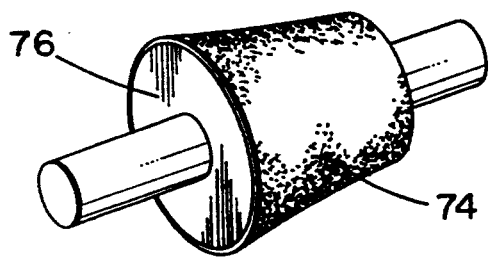
FIGS. 5A, 5B, and 5C are detail perspective views diagrammatically illustrating steps used in the fabrication of another component of the invention.
Figure 5D:
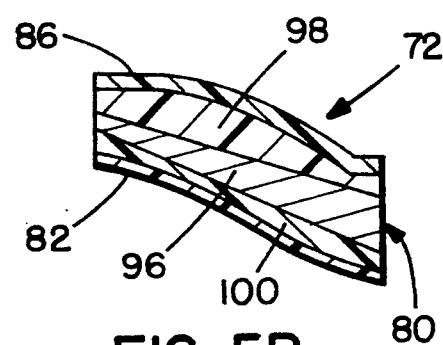
FIG. 5D is a detail cross section view of FIG. 5C.
Figure 5C:
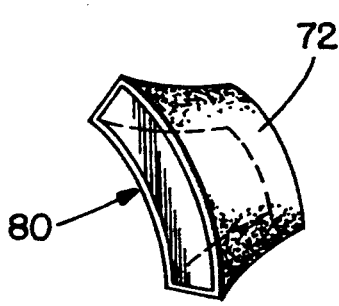
Figure 5B:
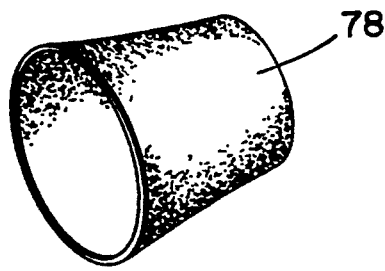
Figure 10:
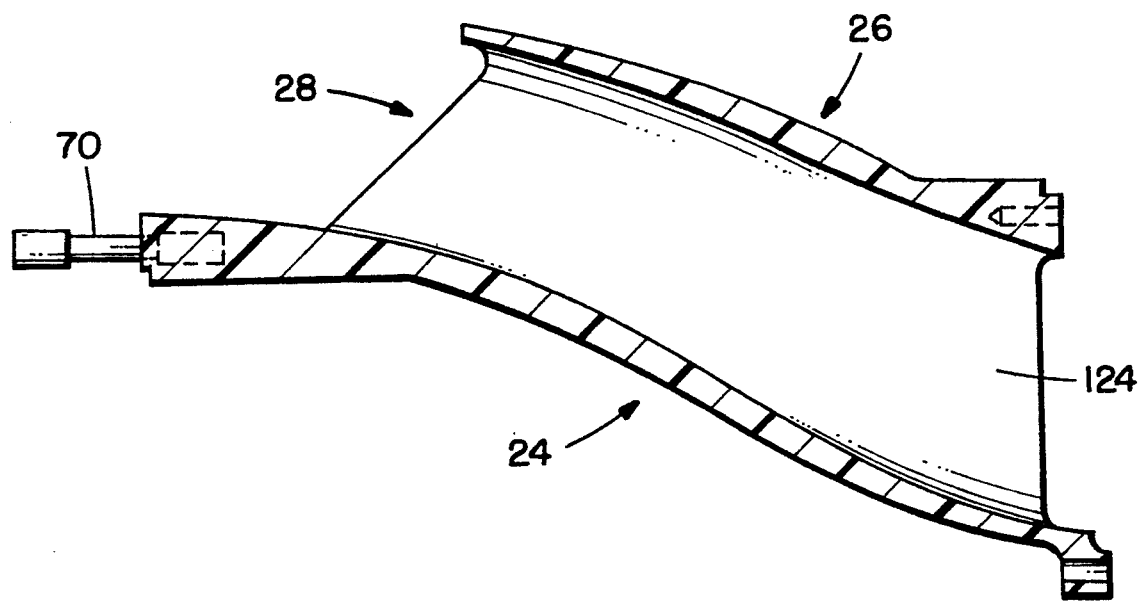
FIG. 10 is a cross section view taken generally along line 10—10 in FIG. 9.

Later in the process, but not at this time, after each modified duct preform 72 will have attained the shape of the duct mold 80, it is then removed. As seen in FIG. 5D, the duct mold 80 may, for convenience and practicality, be actually comprised of three components for ease of removal of the duct preform 72. As illustrated, the duct mold 80 includes a central, substantially rigid member 96 and a pair of preferably resilient side members 98, 100 which actually contact the fibers of the duct preform 72. As illustrated, upon removal of the wedge-shaped central member 96, the side members 98, 100 can then be readily slipped out of the duct preform 72. Of course, it will be appreciated that numerous other constructions of the duct mold 80 can be utilized and that the construction described is only for purposes of explanation. After formation of a plurality of duct preforms 72 on their associated duct molds 80, the duct preforms, together with their associated duct molds, are administered onto the outer peripheral surface 84 of the inner shell preform 71 (see FIGS. 6 and 7). With their inner duct surfaces 82 in mating engagement with the outer peripheral surface 84 of the inner shell preform, the modified duct preforms 72 are positioned in a side-by-side relationship at desired forward and aft locations on the inner shell preform and such that the lateral surfaces 92, 94 on adjacent modified duct preforms are coextensive and engaged. As seen in FIG. 7, the plurality of the modified duct preforms completely circumscribe the inner shell preform.

Thereupon, as indicated in FIG. 7, a plurality of fibers 102 are braided across the outer duct surfaces 86 (or onto a similarly shaped mandrel) and completely circumscribe the modified duct preforms 72 which, in turn, completely circumscribe the inner shell preform 71. By so doing, an outer shell preform 104 is produced spaced from and coaxial with the inner shell preform. See FIG. 7A.

In this manner, fabrication of an inlet housing preform 106 as illustrated in FIG. 8 is completed, being an integral structure comprised of the inner shell preform 71, the plurality of modified duct preforms 72, and the outer shell preform 104. At this stage, however, the inlet housing preform 106 continues to envelop the shaped mandrel 44 and the duct molds 80. Thereupon, an outer mold 108 is administered to the outermost surface of the outer shell preform 104 so as to be in contiguous engagement therewith. Additional insert molds 110, 111 are positioned at a forward end of the inlet housing preform 106 to assure a void in that region following the next step of the process which is about to be described. It will be appreciated that the upper portions of FIG. 8 correspond to the forward portions of the inlet housing preform 106. Thereupon, a forward end cap 112 which is annularly shaped is placed in contiguous engagement with the outer mold 108, the insert molds 110, 111, and the shaped mandrel 44. In similar fashion, a rear end cap 114 is placed in contiguous engagement with the trailing portions of the inlet housing preform 106 and, more specifically, with those associated regions of the outer mold 108, duct molds 80, and mandrel 44. The entire structure thus described is then supported between forward and rear press plates 116, 118, respectively, to maintain the entire structure in an integral relationship.

Figure 9:
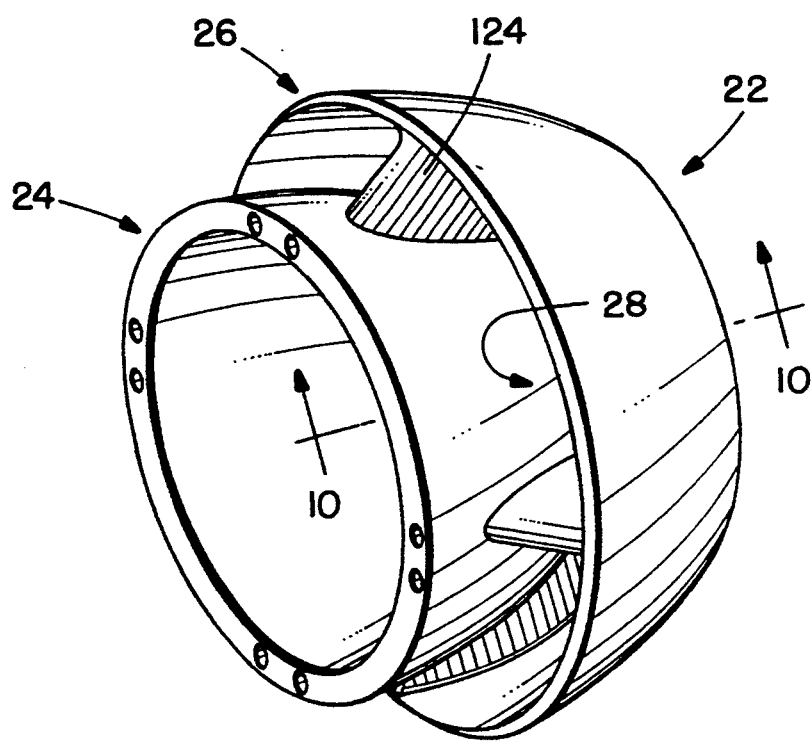
FIG. 9 is a perspective view of a completed inlet housing fabricated in accordance with the invention.
Figure 11:
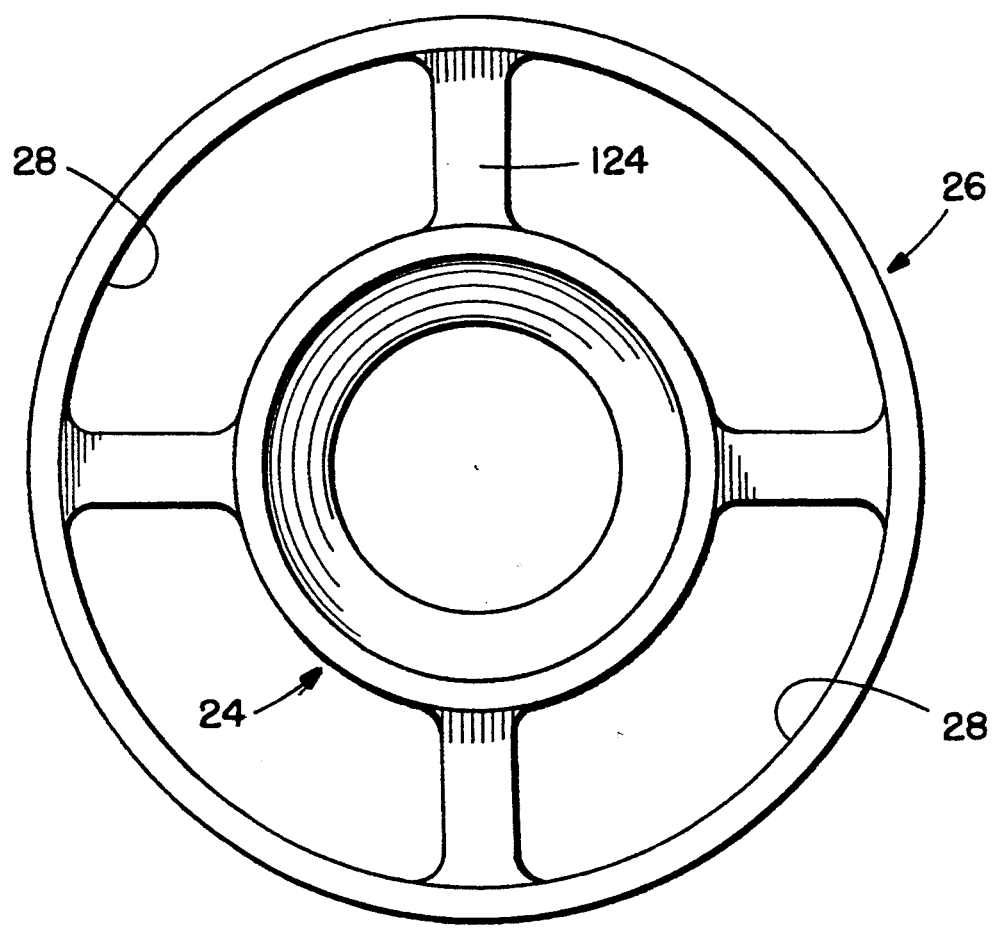
FIG. 11 is a front elevation view of the inlet housing illustrated in FIG. 9.

Thereafter, suitable resin is applied, under suitable pressure, through aligned apertures 120, 122 in the press plate 118 and rear end cap 114, respectively and thereby into the interstices of the braided fibers in the entire inlet housing preform 106. The resin is applied until all voids within the inlet housing preform are filled. The entire structure illustrated in FIG. 8 is then placed in a suitable oven and the resin cured to thereby form an integral structure in the nature of the inlet housing 22 as illustrated in FIG. 9. The inlet housing 22 illustrated in FIG. 9 results upon removal of the pressplates 116, 118, the end caps 112, 114, the mandrel 44, the duct molds 80, the insert molds 110, 111, and the outer mold 108. As previously described, the inlet housing 22 is comprised of the inner shell 24 and the outer shell 26. A plurality of circumferentially spaced strut members 124 result from the adjoining lateral walls 88, 90 of the juxtaposed modified duct preforms 72. The passageways 28 result from the spacing between the inner shell 24, the outer shell 26, and the strut members 124.

While preferred embodiments of the invention have been disclosed in detail, it should be understood by those skilled in the art that various other modifications may be made to the illustrated embodiments without departing from the scope of the invention as described in the specification and defined in the appended claims.

We claim:

1. A method of making an integral structure comprised of inner and outer coaxial shells mutually supported so as to define an annular passageway therebetween comprising the steps of:

(a) braiding on a shaped mandrel a plurality of fibers to form an inner shell preform having an outer surface being substantially a surface of revolution;

(b) braiding on a conical mandrel a plurality of fibers to form a duct preform having a conical shape;

(c) removing the duct preform from the conical mandrel;

(d) administering each of a plurality of the duct preforms formed in step (b) onto an outer peripheral surface of a duct mold having a shape different from that of the conical mandrel so as to contiguously conform to the shape of the duct mold and thereby define a modified duct preform including an inner duct surface shaped to congruently mate with the outer surface of the inner shell preform, an outer duct surface spaced from the inner duct surface, and first and second lateral walls having opposed lateral surfaces;

(e) mounting the plurality of the modified duct preforms together with their associated duct molds onto the outer surface of the inner shell preform in side-by-side relationship such that the first and second lateral surfaces on adjacent modified duct preforms are coextensive and engaged, the plurality of the modified duct preforms completely circumscribing the inner shell preform;

(f) braiding a plurality of fibers across the plurality of outer duct surfaces to form an outer shell preform spaced from and coaxial with the inner shell preform and to integrally encapsulate the outer duct surfaces;

(g) applying resin to structure defined by the braided inner shell preform, the braided modified duct preforms, and the braided outer shell preform to fill all voids in the structure; and (h) curing the resin to thereby form an integral structure comprised of inner and outer shells and a plurality if circumferentially spaced strut members defined by the engaged first and second lateral walls of the adjoining modified duct preforms.

2. A method of making an integral structure as set forth in claim 1 wherein the inner shell preform has a generally cylindrical passage extending therethrough and extends between an annular leading end and an annular trailing end; and including the steps of:

(i) administering to the annular leading end a first annular metallic end plate with fastener means thereon in proximate engagement therewith;

(j) administering to the annular trailing end a second annular metallic end plate with fastener means thereon in proximate engagement therewith; and (k) during step (a), braiding a plurality of the fibers so as to intertwine the first and second end plates for fixation thereof to the inner shell preform.

3. A method of making an integral structure as set forth in claim 2 wherein the outer shell preform has an outermost surface being substantially a surface of revolution and extends between an annular leading end and an annular trailing end; and including the steps of:

(l) administering to the annular leading end of the outer shell preform a third annular metallic end plate with fastener means thereon in proximate engagement therewith;

(m) administering to the annular trailing end of the outer shell preform a fourth annular metallic end plate with fastener means thereon in proximate engagement therewith; and (n) during step (f), braiding a plurality of the fibers so as to intertwine the third and fourth end plates for fixation thereof to the outer shell preform.

4. A method of making an integral structure as set forth in claim 3 including the steps of:

(o) administering to the outermost surface of the outer shell preform an outer mold in contiguous engagement therewith;

(p) placing a forward end cap in contiguous engagement with the first and third end plates;

(q) placing a rear end cap in contiguous engagement with the second and fourth end plates;

(r) supporting the forward and rear end caps between spaced apart forward and rear press plates, respectively; and wherein step (g) includes the step of:

(s) applying resin through apertures in the forward and rear press plates and through apertures in the forward and rear end caps to fill all voids in the braided inner shell preform, the braided duct preforms, and the braided outer shell preform.

5. (Amended) A method of making an integral structure as set forth in claim 4 including the steps of:

(t) withdrawing the forward and rear end plates from engagement with the forward and rear end caps, respectively;

(u) withdrawing the forward end cap from contiguous engagement with the first and third end plates;

(v) withdrawing the rear end cap from contiguous engagement with the second and fourth end plates;

(w) withdrawing the shaped mandrel from the formed inner shell;

(x) withdrawing each of a plurality of the duct molds from the regions defined by the formed inner shell, the formed outer shell, and the circumferentially spaced strut members; and (y) withdrawing the outer mold from its contiguous engagement with the outermost surface of the outer shell.

6. A method of making an integral structure as set forth in claim 1 wherein:

the plurality of fibers utilized in steps (a) and (f) are comprised of graphite.

7. A method of making an integral structure as set forth in claim 1 wherein:

the plurality of fibers utilized in steps (a) and (f) are comprised of boron.

8. A method of making an integral structure as set forth in claim 1 wherein:

the plurality of fibers utilized in steps (a) and (f) are comprised of glass.

9. A method of making an integral structure as set forth in claim 1 wherein:

the plurality of fibers utilized in steps (a) and (f) are comprised of aramid fibers.

10. A method of making an integral structure comprised of an outer shell coaxially supported on an inner member having an outer surface which is substantially a surface of revolution so as to define an annular passageway between the inner member and the outer shell comprising the steps of:

(a) braiding on a conical mandrel a plurality of fibers to form a duct preform having a conical shape;

(b) removing the duct preform from the conical mandrel;

(c) administering each of a plurality of the duct preforms onto an outer peripheral surface of a duct mold having a shape different from that of the conical mandrel so as to contiguously conform to the duct mold and thereby define a modified duct preform including an inner duct surface shaped to congruently mate with the outer surface of the inner member, an outer duct surface spaced from the inner duct surface, and first and second lateral walls having opposed lateral surfaces;

(d) mounting the plurality of the modified duct preforms together with their associated duct molds onto the outer surface of the inner member in side-by-side relationship such that the first and second lateral surfaces on adjacent modified duct preforms are coextensive and engaged, the plurality of the modified duct preforms completely circumscribing the inner member;

(e) braiding a plurality of fibers across the plurality of outer duct surfaces to form an outer shell preform spaced from and coaxial with the inner member and to integrally encapsulate the outer duct surfaces;

(f) applying resin to a structure defined by the braided modified duct preforms and the braided outer shell preform to fill all voids in the structure; and (g) curing the resin to thereby form an integral structure comprised of inner member and outer shell and a plurality of circumferentially spaced strut members defined by the engaged first and second lateral walls of the adjoining modified duct preforms.

11. A method of making an integral structure as set forth in claim 10 wherein step (a) includes the steps of:

(h) braiding the plurality of fibers to form an inner layer of an inner shell preform extending between a leading end and a trailing end;

(i) providing a first metallic annular end plate with fastening means thereon adjacent the leading end of the inner shell preform;

(j) providing a second metallic annular end plate with fastening means thereon adjacent the trailing end of the inner shell preform;

(k) braiding a plurality of fibers to form an outer layer of the outer shell preform and intertwining the first and second annular end plates for fixation thereof to the inner shell preform;

(l) applying resin to a structure defined by the braided modified duct preforms and the braided outer shell preform to fill all voids in the structure; and (m) curing the resin to thereby form an integral structure comprised of the inner shell and the outer shell and a plurality of circumferentially spaced strut members defined by the engaged first and second lateral walls of the adjoining modified duct preforms, the first and second annular end plates enabling attachment of the integral structure to other components.

* * * * *